United States Patent
Rubin

(10) Patent No.: US 8,601,179 B1
(45) Date of Patent: Dec. 3, 2013

(54) METHOD AND SYSTEM FOR DATA TRANSFER

(75) Inventor: Jeffrey B Rubin, Pleasanton, CA (US)

(73) Assignee: QLOGIC, Corporation, Aliso Viejo, CA (US)

( * ) Notice: Subject to any disclaimer, the term of this patent is extended or adjusted under 35 U.S.C. 154(b) by 1350 days.

(21) Appl. No.: 11/555,123

(22) Filed: Oct. 31, 2006

(51) Int. Cl.
*G06F 13/00* (2006.01)

(52) U.S. Cl.
USPC .......................................................... 710/34

(58) Field of Classification Search
None
See application file for complete search history.

(56) References Cited

U.S. PATENT DOCUMENTS

| | | | |
|---|---|---|---|
| 5,604,866 A * | 2/1997 | Kolb et al. | 709/235 |
| 6,457,073 B2 * | 9/2002 | Barry et al. | 710/22 |
| 2003/0053130 A1 * | 3/2003 | Omo | 358/1.16 |
| 2003/0172208 A1 * | 9/2003 | Fidler | 710/52 |

* cited by examiner

*Primary Examiner* — Henry Tsai
*Assistant Examiner* — Aurangzeb Hassan
(74) *Attorney, Agent, or Firm* — Klein, O'Neill & Singh, LLP

(57) ABSTRACT

Method and system for a data transfer operation to a device memory is provided. The method includes setting a counter to an initial value; detecting the data transfer operation; determining if information is written to a first memory location of the device memory; counting in a first direction when a total transfer size (N) is written to the first memory location of the device memory; and counting in a second direction when data is written in memory locations other than the first memory location of the device memory, wherein the data transfer operation is complete when a counter value transitions from a non-initial value to an initial value.

14 Claims, 4 Drawing Sheets

| Time | $T_0$ | $T_1$ | $T_2$ | ----- | $T_n$ | $T_{n+1}$ |
|---|---|---|---|---|---|---|
| Counter Value | 0 | 1 | 2 | ----- | N | 0 |

Location T-1 is written

METHOD AND SYSTEM FOR DATA TRANSFER

BACKGROUND

1. Field of the Invention

The present invention relates to computing systems, and more particularly, to efficiently managing data transfer.

2. Background of the Invention

Conventional computing systems typically include several functional components. These components may include a central processing unit ("CPU"), main memory, input/output ("I/O") devices, and streaming storage devices (for example, tape drives).

In conventional systems, the main memory is coupled to the CPU via a system bus or a local memory bus. The main memory (may also be referred to as "CPU memory") is used to provide the CPU access to data and/or program information that is stored in CPU memory at execution time. Typically, the CPU memory is composed of random access memory ("RAM") circuits. A computing system is often referred to as a host system. The term computing system/host system as used throughout this specification, includes network servers.

Different types of hardware devices (may also be referred to as peripheral devices) may operationally interface with the CPU, for example, a host bus adapter/host channel adapter or any other peripheral device. The peripheral devices typically have their own memory (may be referred to as "device memory") and the CPU transfers information (for example, control commands/data) to device memory. It is desirable that transfer to device memory is efficient and that the peripheral device becomes aware of when a transfer is completed, with minimal use of CPU resources and minimal latency.

SUMMARY OF THE PRESENT INVENTION

One embodiment of the present system for data transfer comprises a system for indicating that a data transfer from a host system memory to a memory in a peripheral device is complete. The system comprises a counter associated with the memory in the peripheral device. The counter is set to an initial value. The counter counts in a first direction when a value N representing a total size of the transfer from the host system memory is written to a first memory location of the peripheral device memory. The counter counts in a second direction when data is written in memory locations in the peripheral device other than the first memory location. The counter indicates that the data transfer is complete when the counter transitions from a non-initial value to the initial value.

One embodiment of the present system for data transfer comprises a method for indicating that a data transfer from a host system memory to a memory in a peripheral device is complete. The method comprises the step of setting a counter associated with the memory in the peripheral device to an initial value. The method detects the data transfer from the host system memory to the memory in the peripheral device, and determines if information is written to a first memory location of the peripheral device memory. The method counts in a first direction when a value N representing a total size of the transfer is written to the first memory location of the peripheral device memory. The method counts in a second direction when data is written in memory locations in the peripheral device other than the first memory location of the peripheral device memory. The counter indicates that the data transfer is complete when the counter transitions from a non-initial value to the initial value.

This brief summary has been provided so that the nature of the invention may be understood quickly. A more complete understanding of the invention can be obtained by reference to the following detailed description of the preferred embodiments thereof in connection with the attached drawings.

BRIEF DESCRIPTION OF THE DRAWINGS

The foregoing features and other features of the present invention are now described with reference to the drawings of a preferred embodiment. In the drawings, the same components have the same reference numerals. The illustrated embodiment is intended to illustrate, but not to limit the invention. The drawings include the following Figures.

DETAILED DESCRIPTION

To facilitate an understanding of the adaptive aspects of the present invention, the general architecture and operation of a host system will be described. The specific architecture and operation of the various embodiments will then be described with reference to the general architecture.

Figure 1A:
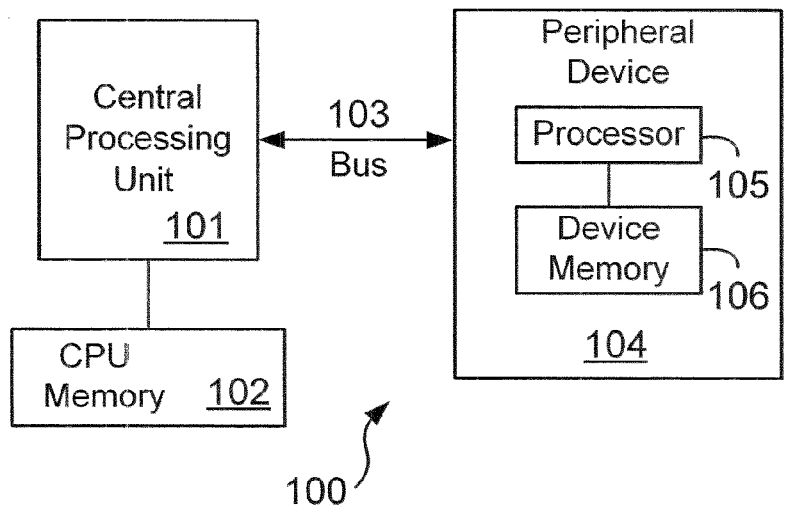
FIG. 1A shows a block diagram of a CPU communicating with a device memory.

FIG. 1A shows a block diagram of a system 100 that may use the adaptive aspects of the present invention. System 100 includes CPU 101 that executes program instructions out of CPU memory 102 that may be random access memory ("RAM"). Read only memory (not shown) is also provided to store invariant instruction sequences such as start-up instruction sequences or basic input/output operating system ("BIOS").

CPU 101 interfaces with a peripheral device (may also be referred to as "device") 104 via link/bus/interface (interchangeably referred to as "interface") 103. Interface 103 may be achieved using different implementations, for example, an input/output bus (PCI-Express and others) or Hyper Transport Interface. These standard interface specifications are incorporated herein by reference in their entirety. The adaptive aspects of the present invention are not limited to any type of bus/inter-connect mechanism.

Device 104 may include processor 105 for executing device firmware or other instructions out of device memory 106. Processor 105 type and capabilities may depend on overall device 104 functionality. For example, if device 104 operates as a host bus adapter ("HBA"), processor 105 may be a reduced instruction set computer ("RISC"). In other applications, processor 105 may be a microprocessor, a state machine or others.

Figure 1B:
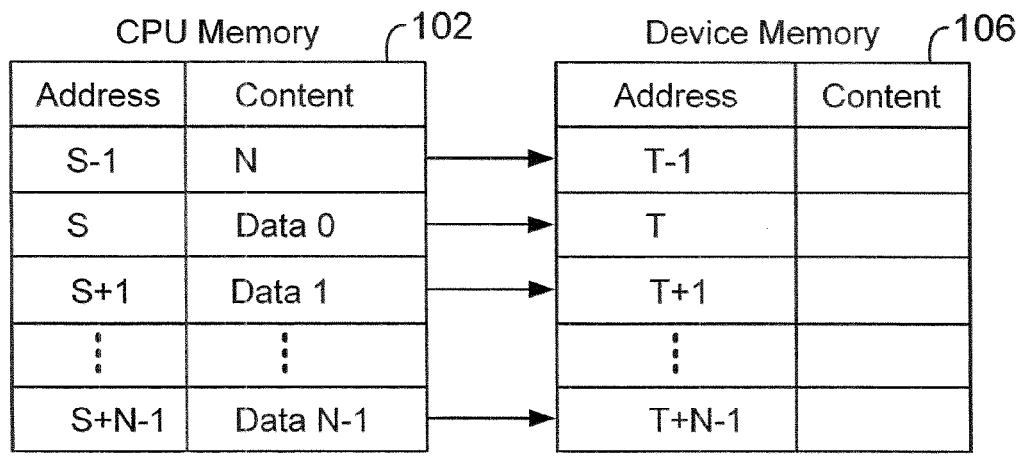
FIG. 1B shows an example of a data transfer from a host system memory to the device memory.

CPU 101 may transfer information from CPU memory 102 to device memory 106. Data transfer between CPU memory 102 and device memory 106 may be a direct memory access ("DMA") transfer. FIG. 1B shows a typical transfer operation. CPU memory 102 has various memory address locations, shown as S−1 to S+N−1. Memory locations in device memory 106 are shown as T−1, T, T+1 and T+N−1.

If the amount of data that is to be transferred to device memory 106 is N units, then location S−1 stores the data transfer size (i.e. N units). First unit, shown as Data 0 is stored at address S, location S+1 stores unit Data 1, location S+N−1 stores unit Data N−1, and so forth.

If data units were to be transferred to device memory 106 in a sequential order, first size N is written to location T−1, Data 0 is written to location T, Data 1 is written to location T+1, Data N−1 is written to T+N−1, and so forth.

It is noteworthy that although the specific examples provided herein show data transfer between CPU memory 102 to device memory 106, the adaptive aspects of the present invention are not limited to data transfers between such memory locations. For example, the adaptive aspects of the present invention are able to handle programmed input/output ("PIO") transfers or any other type of transfer to device memory 106 whether or not data exists in CPU memory 102.

CPU 101 may start a data transfer operation via interface 103. The canonical order of transfer, as shown in FIG. 1B, would be from location S−1 to location T−1, S to T and S+N−1 to T+N−1. However, in systems with conventional CPUs, the canonical order may not always be available due to resource conflicts or any other reason.

Conventional systems use interrupts or "mailbox" registers where CPU 101 writes a bit, which indicates to device 104 that a transfer is complete. Conventional notification systems use CPU resources or incur latency penalties and hence are not desirable.

In one aspect of the present invention, a counter mechanism is used by device 104 that determines when a transfer is complete and notifies device 104 when a transfer is completed. CPU 101 involvement is limited and use of mailbox notifications is not needed.

Figures 2A, 2B, 2C:
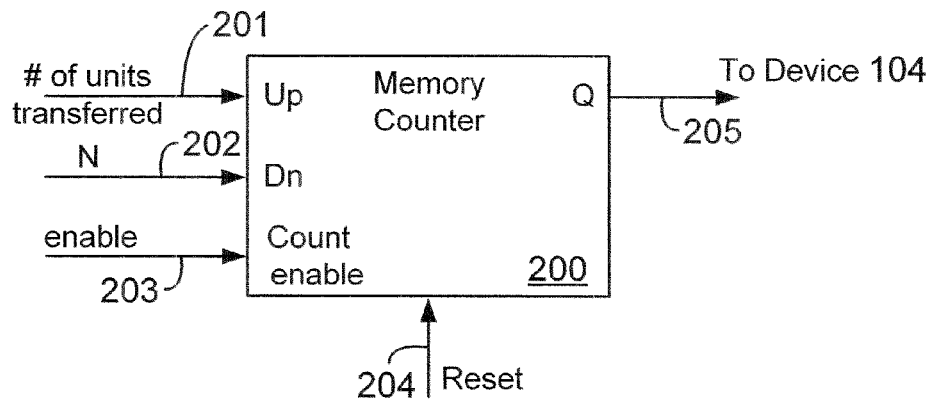
FIG. 2A shows a counter, according to one aspect of the present invention.
FIGS. 2B-2D show examples of how counter values change, according to one aspect of the present invention.

FIG. 2A shows an example of counter 200 that is used to determine when a data transfer operation from CPU memory 102 (or otherwise via a PIO transfer) to device memory 106 is complete. Counter 200 is enabled by signal/command (used interchangeably throughout this specification) 203 generated by CPU 102/processor 105. A reset signal 204 resets counter 200 to a default value, for example, 0. Output 205 from counter 200 is sent to device processor 105.

Counter 200 counts up (increases) and down (reduces) based on inputs 201 and 202 and is not limited to any particular data transfer size. Counter 200 may increase and decrease simultaneously. The term simultaneous, as used herein, means the time allocated for one update of counter 200.

Input 201 includes the number of data units that are being transferred and input 202 is based on N, i.e. the size of the transfer (from location T−1). Location T−1 may be designated as a special memory location where the total size of a data transfer operation (for example, size N (FIG. 1B)) from location S−1 is written.

Counter 200 stores both positive and negative numbers. In one aspect, counter 200 starts with an initial value, for example, 0. When device 104 detects a transfer to location T−1, which may be designated as a special location, counter 200 subtracts the value transferred to location T−1 (for example, N) from a value of counter 200 at that time.

When device 104 detects a transfer to memory location greater than T−1, then counter 200 value is increased. Whenever, counter 200 transitions from a non-initial value (for example, a non-zero value) to the initial value (for example, 0), device 104 may assume that a transfer is completed.

Counter 200 efficiently indicates end of a transfer operation, regardless of whether location T−1 is written at the beginning (Case#1), middle (Case#2) or end (Case #3) of a transfer operation.

Case#1: If device memory location. T−1 is written at the beginning of a transfer operation, counter 200 becomes negative after a value (for example, N) is subtracted. Counter 200 value increases when data is transferred to other device memory 106 locations, for example, T to T+N−1. When counter 200 transitions to zero (initial value), device 104 becomes aware of data transfer completion.

FIG. 2B shows a table with counter values as a function of time. At time T0 (initial state) the counter value is 0. At time T1, if the number N (the number of data transfer units) is transferred to T−1, then counter value is −N (a negative number). As time progresses (T2 to Tn+1), other locations are written and the value of counter 200 transitions from −N to 0.

Case #2: If location T−1 is written during the middle of a data transfer operation, then counter 200 first becomes a positive number because data to other device memory 106 locations (for example, T to T+k−2) are written. When location T−1 is written then counter 200 becomes negative. Thereafter, counter 200 transitions to the initial value for example, 0) when other locations (i.e. non T−1 locations) are written. This signals to device 104 that a transfer is complete.

FIG. 2C shows a table similar to Case #2 table, described above. In this case, counter 200 value increases from time T1 to time Tk−1. When location T−1 is written at time Tk, counter 200 value decreases from K−1−N to 0 at time Tn+1, when the transfer is complete.

Case #3: if location T−1 is written at the end of a transfer, then counter 200 will first reach a maximum value equal to N, the number of data units transferred and when T−1 is written, counter 200 transitions to the initial value (for example 0). This indicates that a transfer operation is complete.

Figures 2D, 2E:
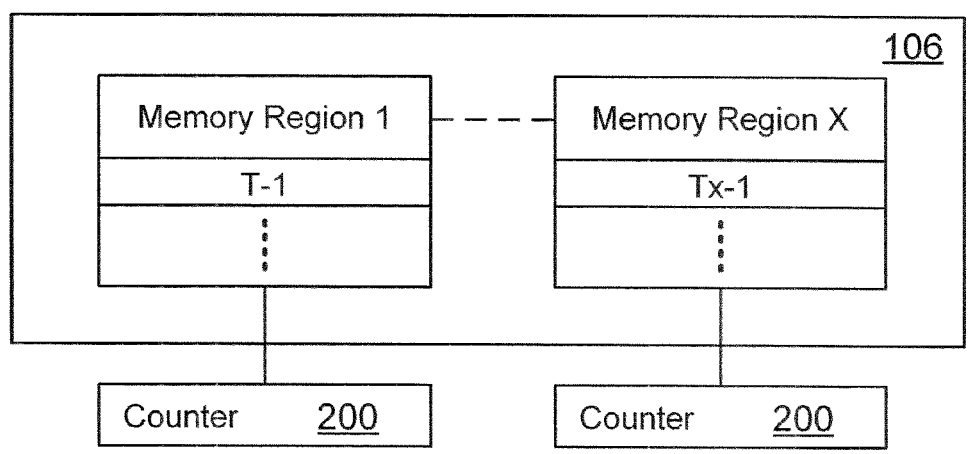
FIG. 2E shows an example of plural counters for plural memory regions, according to one aspect of the present invention.

FIG. 2D shows a table for Case#3. In this case, counter 200 value increases from time T1 to Tn. Thereafter, at time Tn+1, location T−1 is written and counter 200 value transitions to 0.

In all three cases, transition from a non-initial value to an initial value indicates that data transfer is completed. Once transfer is complete, counter 200 is reset.

Figure 3:
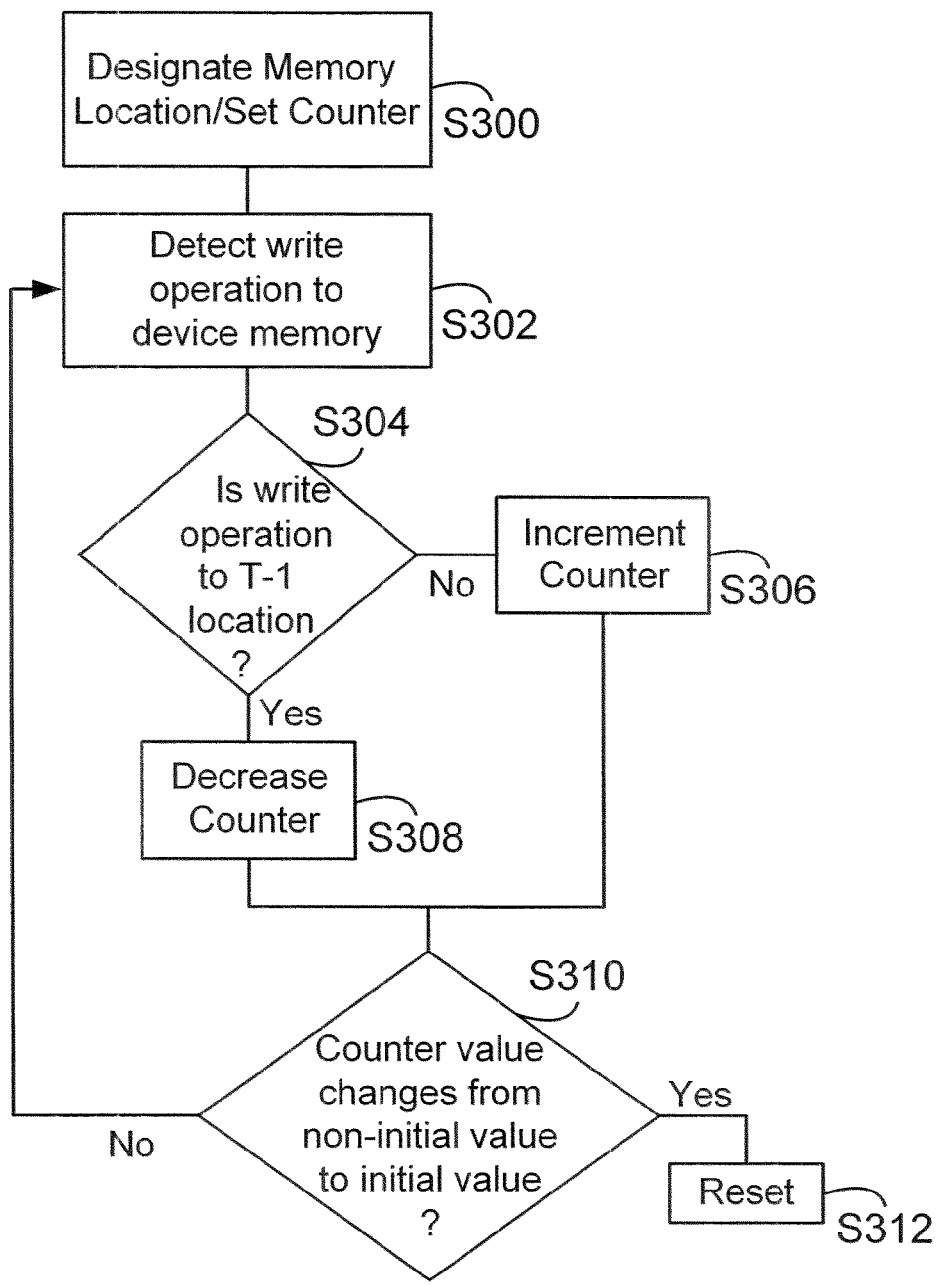
FIG. 3 is a process flow diagram of a data transfer operation, according to one aspect of the present invention.

FIG. 3 shows a process flow diagram for detecting when a data transfer operation to move data to device memory 106 is complete, according to one aspect of the present invention. The process starts in step S300, when a special memory location in device memory 106 is designated. The special memory location (T−1) stores the value, N, which is the total data transfer size for a given transfer operation. Counter 200 is also set to an initial value, which may be zero (0).

In step S302, device 104 detects a write operation to device memory 106.

In step S304, device 106 determines if location T−1 has been written. If yes, then in step S308, counter 200 value is decreased. If not, then in step S306, counter 200 value is increased.

In step S310, the process determines if counter 200 value has transitioned from a non-initial value (for example, a non-zero value) to an initial value (for example, 0). If yes, then counter 200 is reset in step S312, indicating end of a transfer operation. If not, then the process moves back to step S302.

In one aspect of the present invention, multiple device memory regions may use a separate counter for different memory regions. FIG. 2E shows this configuration where memory region 1 and memory region X have separate counters 200 for locations, T−1 and Tx−1, respectively. Plural transfers may occur simultaneously to these regions and device 104 becomes aware of a transfer completion simply by monitoring counter 200 value.

In another aspect of the present invention, counter mechanism 200 can handle any data transfer size.

In another aspect of the present invention, counter 200 may be used for error checking. For example, counter 200 should not decrease in value more than once, i.e. when memory location T−1 is written. If counter 200 changes to a negative value more than once then that can indicate an error condition due to programming mistakes or any other reason.

Although the present invention has been described with reference to specific embodiments, these embodiments are illustrative only and not limiting. Many other applications and embodiments of the present invention will be apparent in light of this disclosure and the following claims.

What is claimed is:

1. A system for indicating that a data transfer from a host system memory to a memory in a peripheral device is complete, comprising:
    a counter associated with the memory in the peripheral device, the counter being set to an initial value, and being configured to count in a first direction when a value N representing a total size of the transfer from the host system memory is written to a first memory location of the peripheral device memory, the counter being further configured to count in a second direction when data is written in memory locations in the peripheral device other than the first memory location;
    wherein when the value N is written to the first memory location the counter counts in the first direction a number equal to the value N; and
    wherein the counter indicates that the data transfer is complete when the counter transitions from a non-initial value to the initial value.

2. The system of claim 1, wherein the first direction is negative and the second direction is positive.

3. The system of claim 1, wherein the first direction is positive and the second direction is negative.

4. The system of claim 1, wherein the initial value is zero.

5. The system of claim 1, wherein the total transfer size is written to the first memory location at a beginning, middle or end of the data transfer.

6. The system of claim 1, wherein the first memory location is designated to store the transfer size information.

7. The system of claim 1, wherein data is written from the host system memory to the peripheral device memory via an input/output bus.

8. A method for indicating that a data transfer from a host system memory to a memory in a peripheral device is complete, the method comprising the steps of:
    setting a counter associated with the memory in the peripheral device to an initial value;
    detecting the data transfer from the host system memory to the memory in the peripheral device;
    determining if information is written to a first memory location of the peripheral device memory;
    counting in a first direction when a value N representing a total size of the transfer is written to the first memory location of the peripheral device memory; and
    counting in a second direction when data is written in memory locations in the peripheral device other than the first memory location of the peripheral device memory;
    wherein when the value N is written to the first memory location the counter counts in the first direction a number equal to the value N; and
    wherein the counter indicates that the data transfer is complete when the counter transitions from a non-initial value to the initial value.

9. The method of claim 8, wherein the first direction is negative and the second direction is positive.

10. The method of claim 8, wherein the first direction is positive and the second direction is negative.

11. The method of claim 8, wherein the initial value is zero.

12. The method of claim 8, wherein the total transfer size is written to the first memory location of the device memory at a beginning, middle or end of the data transfer.

13. The method of claim 8, wherein the first memory location is designated to store the transfer size information.

14. The method of claim 8, wherein data is written from the host system memory to the peripheral device memory via an input/output bus.

* * * * *

UNITED STATES PATENT AND TRADEMARK OFFICE
CERTIFICATE OF CORRECTION

| | | |
|---|---|---|
| PATENT NO. | : 8,601,179 B1 | Page 1 of 1 |
| APPLICATION NO. | : 11/555123 | |
| DATED | : December 3, 2013 | |
| INVENTOR(S) | : Jeffrey B Rubin | |

It is certified that error appears in the above-identified patent and that said Letters Patent is hereby corrected as shown below:

In the Specification

In column 4, line 20, delete "for" and insert -- (for --, therefor.

In column 4, line 28, delete "if" and insert -- If --, therefor.

In column 4, line 37, after "Once" insert -- a --.

Signed and Sealed this
Third Day of June, 2014

Michelle K. Lee
*Deputy Director of the United States Patent and Trademark Office*